United States Patent
Okamura et al.

(10) Patent No.: US 8,097,161 B2
(45) Date of Patent: Jan. 17, 2012

(54) WASTEWATER TREATMENT METHOD

(75) Inventors: Daisuke Okamura, Tokyo (JP);
Tomotaka Hashimoto, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 397 days.

(21) Appl. No.: 12/311,182

(22) PCT Filed: Sep. 19, 2007

(86) PCT No.: PCT/JP2007/068182

§ 371 (c)(1),
(2), (4) Date: Mar. 20, 2009

(87) PCT Pub. No.: WO2008/035710

PCT Pub. Date: Mar. 27, 2008

(65) Prior Publication Data

US 2009/0308809 A1 Dec. 17, 2009

(30) Foreign Application Priority Data

Sep. 21, 2006 (JP) ................................. 2006-256326
Aug. 21, 2007 (JP) ................................. 2007-215234

(51) Int. Cl.
*C02F 3/00* (2006.01)
(52) U.S. Cl. ........................................ 210/614; 210/739
(58) Field of Classification Search .................. 210/614, 210/739
See application file for complete search history.

(56) References Cited

U.S. PATENT DOCUMENTS

| | | | |
|---|---|---|---|
| 5,558,774 | A | 9/1996 | Tonelli et al. |
| 5,837,142 | A | 11/1998 | Mullerheim et al. |
| 6,616,843 | B1 | 9/2003 | Behmann et al. |
| 6,632,358 | B1 | 10/2003 | Suga et al. |

FOREIGN PATENT DOCUMENTS

| | | |
|---|---|---|
| EP | 1 270 513 A1 | 1/2003 |
| EP | 1 464 625 A1 | 10/2004 |
| JP | 62-11597 | 1/1987 |
| JP | 04-235797 A | 8/1992 |
| JP | 2000-157846 A | 6/2000 |
| JP | 2001-276823 A | 10/2001 |
| JP | 2003-053363 A | 2/2003 |
| JP | 2005-040747 A | 2/2005 |
| JP | 2006-212470 A | 8/2006 |
| WO | WO 00/37369 | 6/2000 |

OTHER PUBLICATIONS

Jin-Ki Shim et al., "Membrane Bioreactor and Use of the Same in Water Treatment," News & Information for Chemical Engineers, vol. 20, No. 6, 2002, pp. 721-730.

(Continued)

*Primary Examiner* — Chester Barry
(74) *Attorney, Agent, or Firm* — Finnegan, Henderson, Farabow, Garrett & Dunner, L.L.P.

(57) ABSTRACT

The present invention provides a method that allows solid-liquid separation of activated sludge and a treated liquid to be carried out stably and efficiently by suitably evaluating the risk of clogging prior to membrane clogging and adopting necessary and adequate countermeasures. The present invention provides a wastewater treatment method employing a membrane separation activated sludge process, by which the upper limit of BOD-sludge load is determined based on an index indicating the total organic content of the organic wastewater and a BOD value, and the BOD-sludge load in the activated sludge tank is adjusted so as not to exceed the upper limit.

9 Claims, 3 Drawing Sheets

OTHER PUBLICATIONS

Supplementary European Search Report dated Nov. 22, 2010 issued in corresponding International Application No. PCT/JP2007/068182.

Taiwanese Office Action for TW Application No. 096135616 dated Jul. 27, 2011.

Korean Office Action for KR Application No. 10-2008-7031535 dated Sep. 27, 2011.

WASTEWATER TREATMENT METHOD

The present invention relates to a wastewater treatment method that uses a submerged membrane separation activated sludge process for treating organic wastewater.

BACKGROUND ART

A membrane separation activated sludge process, which is a type of wastewater treatment method, consists of submerging a membrane cartridge in an activated sludge tank and carrying out solid-liquid separation to separate the activated sludge and treated liquid by filtration. Since this method allows solid-liquid separation to be carried out at an extremely high activated sludge (mixed liquor suspended solid: MLSS) concentration of 5000 to 20000 mg/l, it offers the advantages of being able to reduce the volume of the activated sludge tank or shorten the reaction time in the activated sludge tank. In addition, since suspended solids (SS) do not contaminate the treated water due to the use of membrane filtration, a final sedimentation tank is not required, the area of the treatment facility site can be reduced and solid-liquid separation can be carried out regardless of the ease of settling of the activated sludge, thereby resulting in rapid proliferation of this process in recent years since it offers numerous advantages such as being able reduce the burden of activated sludge management.

Flat sheet membranes or hollow fiber membranes are used for the membrane cartridge. In a membrane separation activated sludge process, since the effective membrane surface area is reduced resulting in a decrease in filtration efficiency due to the adherence to the membrane surface of biopolymers metabolized by microorganisms in the activated sludge, the activated sludge itself or contaminants contained in the wastewater, there are cases in which it is difficult to maintain stable filtration for a long period of time. At this time, backwashing may be carried out in which a medium such as filtered water is effused in the opposite direction from the direction of filtration to remove adhered substances on the surface of the membrane.

In the past, in order to avoid this accumulation of activated sludge aggregates, contaminants and the like on the membrane surface and between the membranes, the membranes were aerated with air and the like from the bottom of the membrane cartridge, thereby causing activated sludge aggregates, contaminants and the like to be separated from the membrane surface and between the membranes due to vibration effects of the membranes and agitation effects produced by the upward movement of air bubbles. For example, Japanese Patent Application Laid-open No. 2000-157846 (Patent document 1) discloses a hollow fiber membrane cartridge in which a cartridge head is fastened to be liquid-tight to the outer periphery of one end of a hollow fiber bundle and a skirt is fastened to be liquid-tight to the outer periphery of the other end to allow the hollow fiber membrane to vibrate at the maximum amplitude within an allowed range during aeration, a hollow portion of the end of the hollow fiber membrane on the side of the cartridge head is open, a hollow portion of the end of the hollow fiber membrane on the side of the skirt is sealed, and a plurality of through holes are provided in an adhesive fixing layer on the side of the skirt.

However, stable solid-liquid separation may not be able to be carried out depending on the composition of the organic wastewater flowing into the activated sludge tank even if aeration and backwashing are carried out unless activated sludge treatment conditions are set properly. This is thought to be because numerous components are excreted that cause microorganisms to clog the membrane.

On the other hand, susceptibility to clogging can be reduced by increasing the concentration of the activated sludge, reducing the amount of organic matter that flows into the activated sludge, or setting a lower membrane filtration permeation flux. However, excessive use of such methods has the problem of decreasing the efficiency of wastewater treatment.

Patent document 1 Japanese Patent Application Laid-open No. 2000-157846

DISCLOSURE OF INVENTION

Problems to be Solved by the Invention

Therefore, an object of the present invention is to provide a method that allows solid-liquid separation of activated sludge and a treated liquid to be carried out stably and efficiently by appropriately evaluating the risk of clogging prior to membrane clogging and adopting necessary and adequate countermeasures.

Means for Solving the Problems

As a result of conducting extensive studies, the inventors of the present invention found that substances that impair filtration by adhering to the outer surface of a membrane are biopolymers composed mainly of sugars that have a molecular weight of several hundred thousand to several million. Moreover, the inventors of the present invention found that the ease of biodegradation of organic wastewater is dependent on the ratio between biochemical oxygen demand (BOD), which measures the concentration of organic matter resulting from biodegradation, and total organic carbon (TOC), which enables measurement of nearly all organic components contained in organic wastewater, total oxygen demand (TOD) or chemical oxygen demand using potassium dichromate ($COD_{Cr}$). Thus, studies were conducted on a method for suitably evaluating the risk of membrane clogging by determining the ratio between BOD and TOC, TOD or $COD_{Cr}$ in the form of a γ value and using that γ value.

As a result, it was found that when treating poorly degradable organic wastewater having a γ value of 0.6 to less than 1.5, there are no increases in sugar concentrations if the BOD-sludge load is set to 0.05–0.06×(δ–0.6) [(kg/day)–BOD/kg–MLSS] or less. In addition, it was found that sugar concentrations can be prevented from increasing and stable filtration can be continued by adjusting the BOD-sludge load to 0.1–0.12×(δ–0.6) [(kg/day)–BOD/kg–MLSS] or less when the γ value is such that 1.5≦γ<2.5, and setting the BOD-sludge load to 0.3–0.24×(δ–0.6) [(kg/day)–BOD/kg–MLSS] or less when treating easily biodegradable organic wastewater having a γ value of 2.5 or more.

Here, δ indicates average membrane filtration flux. The average membrane filtration flux refers to the flow rate per unit membrane surface area per day, and is determined by dividing the value obtained by subtracting the backwashing flow volume from the filtration flow volume by the membrane surface area.

According to these formulas, the upper limit of the BOD-sludge load can be increased by decreasing the average membrane filtration flux δ. Thus, the inventors of the present invention confirmed that stable operation can be continued by reducing the membrane filtration flux even if sugar concentration increases.

Here, the BOD-sludge load is represented by the equation below.

BOD-sludge load=(BOD×average membrane filtration flux×membrane surface area)/(MLSS×activated sludge volume)

As can be understood from this equation, the BOD-sludge load refers to the amount of BOD components that flow into the activated sludge tank in one day per unit sludge weight (MLSS concentration×activated sludge volume), and represents the amount of BOD components attributable to unit microorganisms per day in units of (kg/day)–BOD/kg–MLSS.

In addition, $\gamma=BOD/(\alpha\times\beta)$, and $\beta$ is one of the parameters selected from the previously defined total organic carbon (TOC) [mg/L] in the organic wastewater, chemical oxygen demand using potassium dichromate ($COD_{Cr}$) [mg/L] or total oxygen demand (TOD) [mg/L], where BOD indicates the biological oxygen demand [mg/L] in the organic wastewater, $\alpha$ is an adjustment coefficient based on $\beta$, and
$\alpha=1.0$ in the case of selecting TOC for $\beta$,
$\alpha=0.33$ in the case of selecting $COD_{Cr}$ for $\beta$, or
$\alpha=0.33$ in the case of selecting TOD for $\beta$.

Namely, the present invention relates to:

[1] a wastewater treatment method comprising: an inflow step causing organic wastewater to flow into an activated sludge tank housing an activated sludge; and a separation step of biologically treating the organic wastewater in the activated sludge tank with the activated sludge, and carrying out solid-liquid separation on the activated sludge with a separation membrane apparatus installed in or after the activated sludge tank, wherein prior to the inflow step, an upper limit of BOD-sludge load is determined based on an index indicating the total organic content of the organic wastewater and a BOD value, and the BOD-sludge load in the activated sludge tank is adjusted so as not to exceed the upper limit;

[2] a wastewater treatment method comprising: an inflow step of causing organic wastewater to flow into an activated sludge tank housing an activated sludge; and a separation step of biologically treating the organic wastewater in the activated sludge tank with the activated sludge, and carrying out solid-liquid separation on the activated sludge with a separation membrane apparatus installed in or after the activated sludge tank, wherein prior to the inflow step, an upper limit of BOD-sludge load is determined based on a ratio between an index indicating the total organic content of the organic waste water and a BOD value, and average membrane filtration flux of the membrane separation apparatus, and the BOD-sludge load in the activated sludge tank is adjusted so as not to exceed the upper limit;

[3] a wastewater treatment method comprising: an inflow step of causing organic wastewater to flow into an activated sludge tank housing an activated sludge; and a separation step of biologically treating the organic wastewater in the activated sludge tank with the activated sludge, and carrying out solid-liquid separation on the activated sludge with a separation membrane apparatus installed in or after the activated sludge tank, wherein a BOD-sludge load in the activated sludge tank is adjusted to 0.05–0.06×($\delta$–0.6) [(kg/day)–BOD/kg–MLSS] or less when a $\gamma$ value of the organic wastewater is such that $0.6\leqq\gamma<1.5$;

[wherein, $\gamma=BOD/(\alpha\times\beta)$, $\beta$ is one of the parameters selected from the total organic carbon (TOC) [mg/L] in the organic wastewater, chemical oxygen demand using potassium dichromate ($COD_{Cr}$) [mg/L] and total oxygen demand (TOD) [mg/L], BOD indicates the biological oxygen demand [mg/L] in the organic wastewater, $\alpha$ is an adjustment coefficient based on $\beta$,
$\alpha=1.0$ in the case of selecting TOC for $\beta$,
$\alpha=0.33$ in the case of selecting $COD_{Cr}$ for $\beta$, or
$\alpha=0.33$ in the case of selecting TOD for $\beta$, and $\delta$ is defined as the average membrane filtration flux of the separation membrane apparatus in units of $m^3/(m^2\cdot day)$];

[4] a wastewater treatment method comprising: an inflow step of causing organic wastewater to flow into an activated sludge tank housing an activated sludge; and a separation step of biologically treating the organic wastewater in the activated sludge tank with the activated sludge, and carrying out solid-liquid separation on the activated sludge with a separation membrane apparatus installed in or after the activated sludge tank, wherein a BOD-sludge load in the activated sludge tank is adjusted to 0.1–0.12×($\delta$–0.6) [(kg/day)–BOD/kg–MLSS] or less when a $\gamma$ value of the organic wastewater is such that $1.5\leqq\gamma<2.5$ [wherein, $\gamma$ and $\delta$ are the same as defined in [3] above];

[5] a wastewater treatment method comprising: an inflow step of causing organic wastewater to flow into an activated sludge tank housing an activated sludge; and a separation step of biologically treating the organic wastewater in the activated sludge tank with the activated sludge, and carrying out solid-liquid separation on the activated sludge with a separation membrane apparatus installed in or after the activated sludge tank, wherein a BOD-sludge load in the activated sludge tank is adjusted to 0.3–0.24×($\delta$–0.6) [(kg/day)–BOD/kg–MLSS] or less when a $\gamma$ value of the organic wastewater is such that $\gamma\geqq2.5$ [wherein, $\gamma$ and $\delta$ are the same as defined in [3] above];

[6] the wastewater treatment method described in any of [3] to [5] above comprising: an inflow step of causing organic wastewater to flow into an activated sludge tank housing an activated sludge; and a separation step of biologically treating the organic wastewater in the activated sludge tank with the activated sludge, and carrying out solid-liquid separation on the activated sludge with a separation membrane apparatus installed in or after the activated sludge tank, wherein by mixing a substance having a high $\gamma$ value into the organic wastewater when the $\gamma$ value of the organic wastewater is $\gamma<0.6$, the $\gamma$ value of the organic wastewater after mixing is such that $\gamma\geqq0.6$ [wherein, $\gamma$ is the same as defined in [3] above];

[7] the wastewater treatment method described in any of [1] to [6] above, wherein the BOD-sludge load in the activated sludge tank is adjusted by increasing or decreasing one or more of parameters selected from the group consisting of activated sludge concentration, activated sludge volume, amount of organic matter flowing into the activated sludge tank, average membrane filtration flux and membrane surface area;

[8] the wastewater treatment method described in any of [3] to [6] above, wherein in the case the BOD-sludge load in the activated sludge tank exceeds the calculated upper limit of the BOD-sludge load, the upper limit of the BOD-sludge load is adjusted so as to exceed the BOD-sludge load in the activated sludge tank by decreasing the average membrane filtration flux; and

[9] the wastewater treatment method described in any of [3] to [6] above, wherein in the case the BOD-sludge load in the activated sludge tank exceeds the calculated upper limit of the BOD-sludge load, the BOD-sludge load in the activated sludge tank is adjusted so as to be below the upper limit by increasing or decreasing one or more of parameters selected from the group consisting of activated sludge concentration, activated sludge volume, amount of organic matter flowing into the activated sludge tank and membrane surface area.

Advantageous Effects of the Invention

According to the present invention, by suitably evaluating the risk of clogging according to a γ value of organic wastewater, and adjusting a BOD-sludge load based on that value, membrane clogging in an activated sludge tank can be suppressed in advance when that risk is high. In addition, efficiency can be enhanced by utilizing solid-liquid separation capacity without waste in cases when the risk is low. The BOD-sludge load can be easily controlled by adjusting MLSS concentration, activated sludge volume, the amount of organic matter flowing into the activated sludge tank and membrane surface area. In other words, in the case of, for example, poorly biodegradable organic wastewater (that in which the γ value is comparatively low), by increasing the amount of activated sludge or reducing the amount of organic matter flowing into the activated sludge tank, the BOD-sludge load can be set to a lower value by increasing the amount of microorganisms relative to the amount of inflowing organic matter. On the other hand, in the case of easily biodegradable organic wastewater (that in which the γ value is comparatively high), since the upper limit of the BOD-sludge load can be set higher, solid-liquid separation efficiency can be enhanced by setting a smaller amount of microorganisms relative to the amount of inflowing organic matter.

In addition, the upper limit of the BOD-sludge load can be increased by reducing average membrane filtration flux δ. Thus, membrane clogging can also be prevented in advance by setting the value of δ so that the upper limit of the BOD-sludge load exceeds the value of the actual BOD-sludge load.

In general, there is the possibility of worsening the quality of treated water if treated under conditions of easily biodegradable organic wastewater even though poorly biodegradable wastewater is actually flowing into the activated sludge tank. However, a constant and satisfactory level of treated water quality can be secured by adjusting treatment conditions according to the method of the present invention.

BEST MODE FOR CARRYING OUT THE INVENTION

The following provides an explanation of preferable embodiments of the wastewater treatment method as claimed in the present invention.

The wastewater treatment method as claimed in the present invention can be carried out using, for example, the apparatus shown in FIG. 1. In FIG. 1, organic wastewater 1 that flows into a membrane separation activated sludge tank is removed of contaminants by pretreatment equipment 2 such as a fine mesh screen or drum screen, after which it is temporarily retained in a flow equalization tank 3. Subsequently, the organic wastewater 1 is fed to a membrane separation activated sludge tank (aeration tank) 4 at a constant flow rate from the flow equalization tank 3 to maintain a constant membrane filtration flux in the membrane separation apparatus.

In membrane separation activated sludge tank (aeration tank) 4, microorganisms degrade and remove organic matter BOD) in the organic wastewater 1. Solid-liquid separation of the activated sludge mixture in membrane separation activated sludge tank 4 is carried out in a submerged separation membrane apparatus 5 submerged in the membrane separation activated sludge tank 4, and a filtrate 9 is detoxified in a sterilization tank 10 as necessary to obtain treated water 11.

In membrane separation activated sludge tank (aeration tank) 4, microorganisms degrade BOD components in the organic wastewater and proliferate.

As was previously described, the inventors of the present invention found that the risk of separation membrane clogging can be avoided by analyzing the water quality of organic wastewater flowing into an activated sludge tank (measuring BOD and TOC, $COD_{Cr}$ or TOD), calculating a γ value by using TOC, $COD_{Cr}$ or TOD, determining the upper limit of a BOD-sludge load according to that γ value, and controlling the actual value of the BOD-sludge load so that it is below that upper limit value.

Time-based changes in the γ value of organic wastewater can be easily determined by periodically measuring BOD, TOC, TOD and $COD_{Cr}$ values, for example, once every few days or once every few weeks, and the determining the ratio of BOD/TOC, BOD/$COD_{Cr}$ or BOD/TOD.

Normally, the value of γ is roughly the same regardless of whether using TOC, TOD or $COD_{Cr}$. Although the γ values of any of these parameters can be suitably selected by a person with ordinary skill in the art in the case each γ value differs and each γ value falls within a range to which different formulas are applied, it is preferable to use these parameters in the order that allows total organic content to be measured more accurately, namely in the order of priority of TOD, $COD_{Cr}$ and TOC.

Furthermore, each of the values of BOD, TOC, TOD and $COD_{Cr}$ can be measured according to methods described in, for example, JIS K 0102.

Since MLSS concentration is increased by reducing the amount of sludge extracted from the activated sludge tank or the amount of organic wastewater flowing into the activated sludge tank is decreased or diluted in cases in which the γ value is 0.6 to less than 1.5, namely in the case of poorly biodegradable organic wastewater, the BOD-sludge load is adjusted to 0.05–0.06×(δ–0.6) [(kg/day)–BOD/kg–MLSS] or less. In the case the γ value is 1.5 to less than 2.5, the BOD-sludge load is adjusted to 0.1–0.12×(δ–0.6) [(kg/day)–BOD/kg–MLSS] or less. In the case the γ value is 2.5 or higher, the BOD-sludge load is adjusted to 0.3–0.24×(δ–0.6) [(kg/day)–BOD/kg–MLSS] or less. As a result of adjusting in this manner, clogging of the separation membrane can be prevented while allowing stable and efficient continuation of solid-liquid separation by the separation membrane without impairing the quality of treated water.

In addition, the upper limit of the BOD-sludge load as determined with the above formula can be increased by decreasing the average membrane filtration flux δ of the membrane separation apparatus. Thus, by setting the value of δ within a range that yields an upper limit that exceeds the actual BOD-sludge load, clogging of the separation membrane can be prevented while allowing stable and efficient continuation of solid-liquid separation by the separation membrane without impairing the quality of treated water.

Furthermore, the present invention can be applied even in the case the membrane separation activated sludge tank (aeration tank) 4 is an aerobic tank-oxygen-free tank for denitrification. In addition, the present invention can also be applied in the case the separation membrane apparatus is provided after the activated sludge tank.

EXAMPLES

Although the following provides an explanation of examples of the present invention, the present invention is not limited by these examples.

Examples 1 to 3 and Comparative Examples 1 and 2

Changes in membrane filtration flux in a membrane separation activated sludge process were confirmed by adjusting BOD-sludge load according to the method described below.

First, a membrane separation activated sludge experiment was carried out using three types of organic wastewater consisting of sugar refinery wastewater (γ value: 1.9), cleaner plant wastewater (γ value: 1.3) and tofu plant wastewater (γ value: 4.4), followed by an evaluation of stable membrane filtration flux for various BOD-sludge loads. A membrane module having a membrane surface area of 0.015 m$^2$ and consisting of a bundle of a large number of hollow fiber precision filtration membranes made of PVDF having a pore diameter of 0.1 μm was used for the separation membrane apparatus. Membrane aeration consisted of feeding in air from the bottom of the membrane module at a flow rate of 200 L/h. Here, stable membrane filtration flux is defined as that demonstrating an increase in membrane filtration pressure from the initial pressure of no more than 10 kPa even after 20 days have elapsed since the start of operation.

The results are shown in FIG. 2. In all cases, when the BOD-sludge load was high, stable membrane filtration flux was low and stable membrane filtration flux conversely increased when the BOD-sludge load was set to a low level. In addition, different curves were depicted depending on the type of wastewater. In the case of a BOD/TOC, or γ value, of 1.3, although stable membrane filtration flux was 0.8 m/D when the BOD-sludge load was 0.03 (Example 1), stable membrane filtration flux was 0.3 m/D when the BOD-sludge load was 0.06 (Comparative Example 1). In the case of a BOD/TOC value, or γ value, or 1.9, although stable membrane filtration flux was 0.7 m/D when the BOD-sludge load was 0.07 (Example 2), stable membrane filtration flux was 0.2 m/D when the BOD-sludge load was 0.13 (Comparative Example 2). In the case of a BOD/TOC value, or γ value, of 4.4, stable membrane filtration flux was 0.65 m/D even when the BOD-sludge load was 0.12 (Example 3).

Thus, the BOD-sludge load to be set in the solid-liquid separation step carried out by the separation membrane apparatus was able to confirmed to differ according to the BOD/TOC value (=γ value).

Examples 4 to 9 and Comparative Examples 3 to 8

A separation membrane apparatus, consisting of a module containing precision filtration hollow fiber membranes made of PVDF manufactured by Asahi Kasei Chemicals Corp. and having a pore diameter of 0.1 μm, was submerged in an activated sludge tank having an activated sludge volume of 10 L followed by treatment of various wastewater using a membrane separation activated sludge process. Membrane aeration consisted of feeding in air from the bottom of the membrane module at a flow rate of 200 NL/h. The retention time of the wastewater in the activated sludge tank was 18 hours. Water quality of the wastewater was analyzed once a day.

(1) Chemical plant wastewater was treated using a membrane separation activated sludge process by adjusting the BOD to 300 mg/L by diluting with water using a membrane surface area of 0.022 m$^2$ and setting the membrane filtration flux to 0.6 m/D. The upper limit of the BOD-sludge load was calculated to be 0.05 [(kg/day)-BOD/kg-MLSS]. TOC at this time was 500 mg/L and the γ value was 0.6. The BOD-sludge load was set to 0.033 [(kg/day)-BOD/kg-MLSS] below the calculated upper limit by making the MLSS concentration 12000 mg/L. The membrane filtration pressure immediately after the start of operation was 4 kPa. The membrane filtration pressure on day 20 after the start of operation was 10 kPa (Example 4).

Since the filtration pressure had stabilized, when MLSS was reduced to 6500 mg/L on day 21 and the BOD-sludge load was set to 0.061 [(kg/day)-BOD/kg-MLSS] above the upper limit, the filtration pressure reached 30 kPa on day 25 (Comparative Example 3).

Subsequently, the membrane module was washed and operation was carried out after setting the membrane filtration flux to 0.35 m/D. The upper limit of the BOD-sludge load was determined to be 0.065 [(kg/day)-BOD/kg-MLSS]. When the value of the BOD-sludge load was maintained at 0.061 [(kg/day)-BOD/kg-MLSS] by adjusting membrane surface area, the filtration pressure was 10 kPa on day 20 in contrast to an initial pressure of 4 kPa (Example 10).

Moreover, when operation was carried out while setting the BOD-sludge load to 0.02 [(kg/day)-BOD/kg-MLSS] and the membrane filtration flux to 1.0 m/D by adjusting the dilution factor of the untreated water, the upper limit of the BOD-sludge load was 0.026 [(kg/day)-BOD/kg-MLSS] and the pressure 20 days later was 13 kPa (Example 16).

When the BOD-sludge load was then increased to 0.035 [(kg/day)-BOD/kg-MLSS] by adjusting the dilution factor of the untreated water while maintaining a membrane filtration flux of 1.0 m/D, the membrane filtration pressure 20 days later was 40 kPa (Comparative Example 9).

(2) Cleaner plant wastewater was treated using a membrane separation activated sludge process by adjusting the BOD to 350 mg/L by diluting with water using a membrane surface area of 0.022 m$^2$ and setting the membrane filtration flux to 0.6 m/D. The upper limit of the BOD-sludge load was calculated to be 0.05 [(kg/day)-BOD/kg-MLSS]. TOC at this time was 260 mg/L and the γ value was 1.34. The BOD-sludge load was set to 0.039 [(kg/day)-BOD/kg-MLSS] by making the MLSS concentration 12000 mg/L. The membrane filtration pressure immediately after the start of operation was 5 kPa. The membrane filtration pressure on day 20 after the start of operation was 12 kPa (Example 5).

Since the filtration pressure had stabilized, when MLSS was reduced to 6500 mg/L on day 21 and the BOD-sludge load was set to 0.071 [(kg/day)-BOD/kg-MLSS] above the upper limit, the filtration pressure reached 35 kPa on day 25 (Comparative Example 4).

Subsequently, when the membrane module was washed and operation was carried out after setting the membrane filtration flux to 0.2 m/D while maintaining the BOD-sludge load by adjusting the membrane surface area (upper limit of BOD-sludge load: 0.074 [(kg/day)-BOD/kg-MLSS]), the filtration pressure was 11 kPa on day 20 in contrast to an initial pressure of 4 kPa (Example 11).

Moreover, when operation was carried out while setting the BOD-sludge load to 0.03 [(kg/day)-BOD/kg-MLSS] and the membrane filtration flux to 0.8 m/D by adjusting the dilution factor of the untreated water (upper limit of BOD-sludge load: 0.038 [(kg/day)–BOD/kg–MLSS]), the pressure 20 days later was 14 kPa (Example 17). When the BOD-sludge load was then increased to 0.045 [(kg/day)–BOD/kg–MLSS] by adjusting the dilution factor of the untreated water while maintaining a membrane filtration flux of 0.8 m/D, the membrane filtration pressure 20 days later was 35 kPa (Comparative Example 10).

(3) Dyeing plant wastewater was treated using a membrane separation activated sludge process by adjusting the BOD to 750 mg/L by diluting with water using a membrane surface area of 0.022 m$^2$ and setting the membrane filtration flux to 0.6 m/D. The upper limit of the BOD-sludge load was determined to be 0.1 [(kg/day)–BOD/kg–MLSS]. $COD_{Cr}$ at this time was 1400 mg/L and the γ value was 1.62. The BOD-sludge load was set to 0.1 [(kg/day)–BOD/kg–MLSS] by making the MLSS concentration 10000 mg/L. The membrane filtration pressure immediately after the start of operation was 4 kPa. The membrane filtration pressure on day 20 after the start of operation was 11 kPa (Example 6).

Since the filtration pressure had stabilized, when the BOD-sludge load was set to 0.12 [(kg/day)–BOD/kg–MLSS] by adjusting the BOD of the same wastewater to 900 mg/L on day 21, the filtration pressure reached 37 kPa on day 25 (Comparative Example 5).

Subsequently, when the membrane module was washed and operation was carried out after setting the membrane filtration flux to 0.35 m/D while maintaining the BOD-sludge load by adjusting the membrane surface area (upper limit of BOD-sludge load: 0.13 [(kg/day)–BOD/kg–MLSS]), the filtration pressure was 10 kPa on day 20 in contrast to an initial pressure of 5 kPa (Example 12).

Moreover, when operation was carried out while setting the BOD-sludge load to 0.035 [(kg/day)–BOD/kg–MLSS] and the membrane filtration flux to 1.0 m/D by adjusting the dilution factor of the untreated water (upper limit of BOD-sludge load: 0.052 [(kg/day)–BOD/kg–MLSS]), the pressure 20 days later was 13 kPa (Example 18). When the BOD-sludge load was then increased to 0.06 [(kg/day)–BOD/kg–MLSS] by adjusting the dilution factor of the untreated water while maintaining a membrane filtration flux of 1.0 m/D, the membrane filtration pressure 20 days later was 38 kPa (Comparative Example 11).

(4) Semiconductor plant wastewater was treated using a membrane separation activated sludge process by adjusting the BOD to 750 mg/L by diluting with water using a membrane surface area of 0.022 m$^2$ and setting the membrane filtration flux to 0.6 m/D. The upper limit of the BOD-sludge load was determined to be 0.1 [(kg/day)–BOD/kg–MLSS]. $COD_{Cr}$ at this time was 1000 mg/L and the γ value was 2.27. The BOD-sludge load was set to 0.1 [(kg/day)–BOD/kg–MLSS] by making the MLSS concentration 10000 mg/L. The membrane filtration pressure immediately after the start of operation was 4 kPa. The membrane filtration pressure on day 20 after the start of operation was 9 kPa (Example 7).

Since the filtration pressure had stabilized, when the BOD-sludge load was set to 0.12 [(kg/day)–BOD/kg–MLSS] by adjusting the BOD of the same wastewater to 900 mg/L on day 21, the filtration pressure reached 40 kPa on day 25 (Comparative Example 6).

Subsequently, when the membrane module was washed and operation was carried out after setting the membrane filtration flux to 0.35 m/D while maintaining the BOD-sludge load by adjusting the membrane surface area (upper limit of BOD-sludge load: 0.13 [(kg/day)–BOD/kg–MLSS]), the filtration pressure was 10 kPa on day 20 in contrast to an initial pressure of 4 kPa (Example 13).

Moreover, when operation was carried out while setting the BOD-sludge load to 0.045 [(kg/day)–BOD/kg–MLSS] and the membrane filtration flux to 1.0 m/D by adjusting the dilution factor of the untreated water (upper limit of BOD-sludge load: 0.052 [(kg/day)–BOD/kg–MLSS]), the pressure 20 days later was 14 kPa (Example 19). When the BOD-sludge load was then increased to 0.055 [(kg/day)–BOD/kg–MLSS] by adjusting the dilution factor of the untreated water while maintaining a membrane filtration flux of 1.0 m/D, the membrane filtration pressure 20 days later was 41 kPa (Comparative Example 12).

(5) Enzyme plant wastewater (BOD: 2500 mg/L) was treated using a membrane separation activated sludge process using a membrane surface area of 0.022 m$^2$ and setting the membrane filtration flux to 0.6 m/D. The upper limit of the BOD-sludge load was determined to be 0.3 [(kg/day)–BOD/kg–MLSS]. TOC at this time was 900 mg/L and the γ value was 2.78. The BOD-sludge load was set to 0.33 [(kg/day)–BOD/kg–MLSS] by making the MLSS concentration 10000 mg/L. The membrane filtration pressure immediately after the start of operation was 4 kPa. The membrane filtration pressure on day 10 after the start of operation was 30 kPa (Comparative Example 7).

When the membrane module was washed and the BOD-sludge load was set to 0.29 [(kg/day)–BOD/kg–MLSS] by adjusting the BOD of the enzyme plant wastewater to 2200 mg/L by diluting with water on day 11, the filtration pressure was 10 kPa on day 31 in contrast to a filtration pressure of 5 kPa immediately after washing (Example 8).

Subsequently, when the membrane module was washed and operation was carried out after setting the membrane filtration flux to 0.4 m/D while maintaining the BOD-sludge load by adjusting the membrane surface area (upper limit of BOD-sludge load: 0.348 [(kg/day)–BOD/kg–MLSS]), the filtration pressure was 11 kPa on day 20 in contrast to an initial pressure of 5 kPa (Example 14).

Moreover, when operation was carried out while setting the BOD-sludge load to 0.18 [(kg/day)–BOD/kg–MLSS] and the membrane filtration flux to 1.0 m/D by adjusting the dilution factor of the untreated water (upper limit of BOD-sludge load: 0.204 [(kg/day)–BOD/kg–MLSS]), the pressure 20 days later was 15 kPa (Example 20). When the BOD-sludge load was then increased to 0.25 [(kg/day)–BOD/kg–MLSS] by adjusting the dilution factor of the untreated water while maintaining a membrane filtration flux of 1.0 m/D, the membrane filtration pressure 20 days later was 43 kPa (Comparative Example 13).

(6) Meat processing plant wastewater was treated using a membrane separation activated sludge process by adjusting the BOD to 2200 mg/L by diluting with water using a membrane surface area of 0.022 m$^2$ and setting the membrane filtration flux to 0.6 m/D. The upper limit of the BOD-sludge load was determined to be 0.3 [(kg/day)–BOD/kg–MLSS]. TOC at this time was 600 mg/L and the γ value was 3.67. The BOD-sludge load was set to 0.29 [(kg/day)–BOD/kg–MLSS] by making the MLSS concentration 10000 mg/L. The membrane filtration pressure immediately after the start of operation was 4 kPa. The membrane filtration pressure on day 20 after the start of operation was 11 kPa (Example 9).

Since the filtration pressure had stabilized, when the BOD-sludge load was set to 0.4 [(kg/day)–BOD/kg–MLSS] by adjusting the BOD of the same wastewater to 3000 mg/L on day 21, the filtration pressure reached 40 kPa on day 25 (Comparative Example 8).

Subsequently, when the membrane module was washed and operation was carried out after setting the membrane filtration flux to 0.12 m/D while maintaining the BOD-sludge load by adjusting the membrane surface area (upper limit of BOD-sludge load: 0.42 [(kg/day)–BOD/kg–MLSS]), the filtration pressure was 12 kPa on day 20 in contrast to an initial pressure of 5 kPa (Example 15).

Moreover, when operation was carried out while setting the BOD-sludge load to 0.17 [(kg/day)–BOD/kg–MLSS] and the membrane filtration flux to 1.0 m/D by adjusting the dilution factor of the untreated water (upper limit of BOD-sludge load: 0.20 [(kg/day)–BOD/kg–MLSS]), the pressure 20 days later was 13 kPa (Example 21). When the BOD-sludge load was then increased to 0.3 [(kg/day)–BOD/kg–MLSS] by adjusting the dilatation factor of the untreated water while maintaining a membrane filtration flux of 1.0 m/D, the membrane filtration pressure 20 days later was 39 kPa (Comparative Example 14).

These results are summarized in Table 1.

As has been described above, in the case the γ value is such that $0.6 \leq \gamma < 1.5$, the BOD-sludge load is set to $0.05-0.06 \times (\delta-0.6)$ [(kg/day–BOD/kg–MLSS] or less, in the case the γ value is such that $1.5 \leq \gamma < 2.5$, the BOD-sludge load is set to $0.1-0.12 \times (\delta-0.6)$ [(kg/day–BOD/kg–MLSS] or less, and in the case the γ value is such that $\gamma \geq 2.5$, the BOD-sludge load is set to $0.3-0.24 \times (\delta-0.6)$ [(kg/day–BOD/kg–MLSS] or less. As a result, stable solid-liquid separation can be carried out while maintaining a low filtration pressure without causing membrane clogging.

TABLE 1

Relationship Among γ Value, BOD-Sludge Load and Filtration Pressure

| | γ Value | BOD-Sludge Load [(kg/day)-BOD/kg-MLSS] | Membrane Filtration Flux | Filtration Pressure [kPa] Initial | Filtration Pressure [kPa] Day 20 |
|---|---|---|---|---|---|
| Example 1 | 1.3 | 0.03 | 0.8 | 5 | 10 |
| Example 2 | 1.9 | 0.07 | 0.7 | 4 | 11 |
| Example 3 | 4.4 | 0.12 | 0.65 | 5 | 11 |
| Example 4 | 0.6 | 0.033 | 0.6 | 4 | 10 |
| Example 5 | 1.35 | 0.039 | 0.6 | 5 | 12 |
| Example 6 | 1.62 | 0.1 | 0.6 | 4 | 11 |
| Example 7 | 2.27 | 0.1 | 0.6 | 4 | 9 |
| Example 8 | 2.78 | 0.29 | 0.6 | 5 | 10 |
| Example 9 | 3.67 | 0.29 | 0.6 | 4 | 11 |
| Example 10 | 0.6 | 0.061 | 0.35 | 4 | 10 |
| Example 11 | 1.35 | 0.071 | 0.2 | 4 | 11 |
| Example 12 | 1.62 | 0.12 | 0.35 | 5 | 10 |
| Example 13 | 2.27 | 0.12 | 0.35 | 4 | 10 |
| Example 14 | 2.78 | 0.29 | 0.4 | 5 | 11 |
| Example 15 | 3.67 | 0.4 | 0.12 | 5 | 12 |
| Example 16 | 0.6 | 0.02 | 1.0 | 10 | 13 |
| Example 17 | 1.35 | 0.03 | 0.8 | 11 | 14 |
| Example 18 | 1.62 | 0.035 | 1.0 | 10 | 13 |
| Example 19 | 2.27 | 0.045 | 1.0 | 11 | 14 |
| Example 20 | 2.78 | 0.18 | 1.0 | 10 | 15 |
| Example 21 | 3.67 | 0.17 | 1.0 | 10 | 13 |
| Comp. Ex. 1 | 1.3 | 0.06 | 0.3 | 6 | 13 |
| Comp. Ex. 2 | 1.9 | 0.13 | 0.2 | 5 | 14 |
| Comp. Ex. 3 | 0.6 | 0.061 | 0.6 | 10 | >30 |
| Comp. Ex. 4 | 1.35 | 0.071 | 0.6 | 12 | >35 |
| Comp. Ex. 5 | 1.62 | 0.12 | 0.6 | 11 | >37 |
| Comp. Ex. 6 | 2.27 | 0.12 | 0.6 | 9 | >40 |
| Comp. Ex. 7 | 2.78 | 0.33 | 0.6 | 4 | >30 |
| Comp. Ex. 8 | 3.67 | 0.4 | 0.6 | 11 | >40 |
| Comp. Ex. 9 | 0.6 | 0.035 | 1.0 | 13 | >40 |
| Comp. Ex. 10 | 1.35 | 0.045 | 0.8 | 14 | >35 |
| Comp. Ex. 11 | 1.62 | 0.06 | 1.0 | 13 | >38 |
| Comp. Ex. 12 | 2.27 | 0.055 | 1.0 | 14 | >41 |
| Comp. Ex. 13 | 2.78 | 0.25 | 1.0 | 15 | >43 |
| Comp. Ex. 14 | 3.67 | 0.3 | 1.0 | 13 | >39 |

Example 22

A separation membrane apparatus, consisting of a module containing precision filtration hollow fiber membranes made of PVDF and having a pore diameter of 0.1 μm (membrane surface area: 0.015 m$^2$), was submerged in an activated sludge tank having an effective volume of 10 L followed by treating wastewater from a cleaner plant using a membrane separation activated sludge process. The retention time of the wastewater in the activated sludge tank was 18 hours. The water quality of the wastewater was analyzed once a day. The membrane filtration flux was set to 0.6 m/D. Membrane aeration consisted of feeding in air from the bottom of the membrane module at a flow rate of 200 L/h. The results of operation are shown in FIG. 3.

Analysis of water quality of the wastewater prior to the start of operation yielded results consisting of BOD: 700 mg/L, TOC: 350 mg/L, COD$_{Cr}$: 1100 mg/L and TOD: 1150. Since the γ values at this time ranged from 1.8 to 2.0, the experiment was started by setting the BOD-sludge load to 0.07 (kg/day)–BOD/kg–MLSS. The initial MLSS concentration of the activated sludge was 10 g/L and the MLSS concentration was maintained at 10 g/L by extracting sludge to adjust the amount of sludge. Stable operation was able to be carried out without any increases in filtration pressure through day 7 by setting the BOD-sludge load to a suitable range corresponding to the γ value.

As a result of analyzing the water quality of the wastewater on days 7 to 15, the γ values were found to be about 1.2. Filtration pressure began to rise starting around day 10 of operation and operation was stopped on day 15 since it had reached 27 kPa at that time.

Operation was then resumed after washing the membrane module, replacing the sludge and setting the MLSS of the initially loaded sludge to 15 g/L. The MLSS concentration was maintained at 15 g/L by extracting sludge to adjust the amount of sludge while monitoring measured MLSS values. As a result of analyzing the water quality of the wastewater, since γ values were about 2 from days 16 to 30 of operation, when the wastewater was diluted with water on day 16 to adjust the amount of organic matter flowing into the activated sludge tank and set the BOD-sludge load to 0.05 (kg/day)–BOD/kg–MLSS, filtration pressure did not rise for six days thereafter.

MLSS was maintained at 5 g/L on day 22 of operation by increasing the amount of sludge extracted for the purpose of reducing the amount of air in the activated sludge. The BOD-sludge load at this time was 0.15 (kg/day)–BOD/kg–MLSS. Since the pressure began to rise immediately after lowering the MLSS and filtration pressure reached 13 kPa on day 27 of operation, another activated sludge tank having an effective volume of 10 L was connected and the BOD-sludge load was set to 0.075 (kg/day)–BOD/kg–MLSS. This resulted in the filtration pressure decreasing to 11 kPa.

As has been described above, no matter which method is used to adjust the BOD-sludge load by applying the present invention, whether it be increasing or decreasing the activated sludge concentration, increasing or decreasing the activated sludge volume, or increasing or decreasing the amount of organic matter that flows into the activated sludge tank, stable solid-liquid separation was confirmed to be able to be carried out without causing membrane clogging.

Example 23

Wastewater from a chemical and pharmaceutical plant was treated using a membrane separation activated sludge process. Operation was carried out by setting the membrane filtration flux to 0.6 m/D throughout the course of operation. Membrane aeration consisted of feeding in air from the bottom of the membrane module at a flow rate of 200 L/h.

Analysis of water quality prior to the start of operation yielded results consisting of BOD: 30 mg/L and TOC: 100 mg/L, and the γ value was 0.3. A separation membrane apparatus, consisting of a module containing precision filtration hollow fiber membranes made of PVDF and having a pore diameter of 0.1 μm (membrane surface area: 0.15 m$^2$), was submerged in an activated sludge tank having an effective volume of 10 L followed by setting the MLSS concentration to 10 g/L and beginning operation. At this time, the BOD-sludge load was 0.027 (kg/day)–BOD/kg–MLSS. Although the initial membrane filtration pressure was 5 kPa, it increased to 20 kPa on day 20 of operation.

BOD was then adjusted to 160 mg/L, TOC was adjusted to 150 mg/L and they γ value was set to 1.1 by dissolving peptone in the wastewater. A separation membrane apparatus having a membrane surface area of 0.03 m$^2$ was submerged in an activated sludge tank having an effective volume of 10 L followed by setting the MLSS concentration to 10 g/L and beginning operation. At this time, the BOD-sludge load was 0.029 (kg/day)–BOD/kg–MLSS. The initial membrane filtration pressure was 5 kPa, and the membrane filtration pressure 20 days later was 8 kPa.

As has been described above, as a result of applying the present invention to organic wastewater having a γ value of less than 0.6 by adding a substance having a large γ value in the form of peptone, stable solid-liquid separation was confirmed to be able to be carried out without causing membrane clogging.

DESCRIPTION OF REFERENCE NUMERALS

Figure 1:
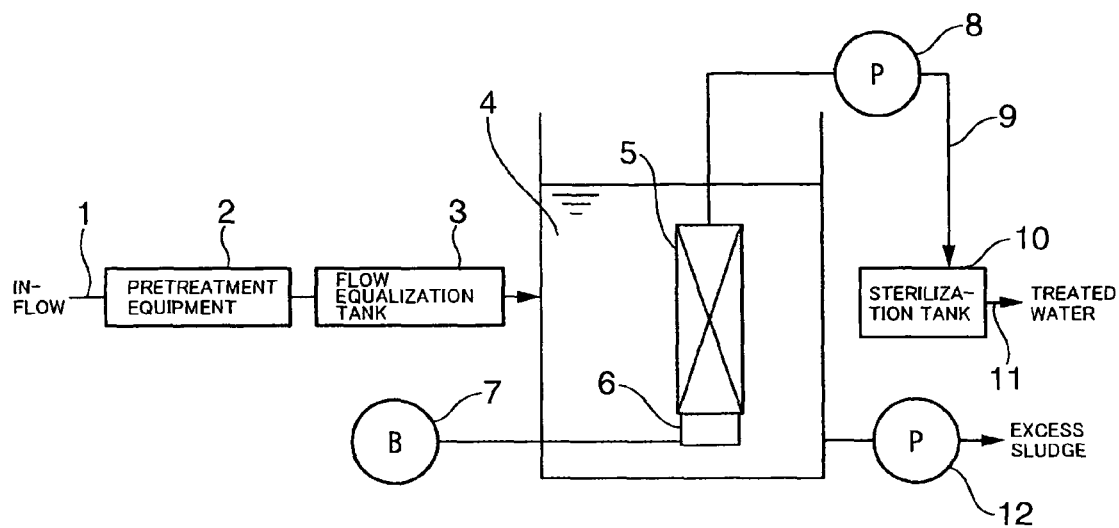
FIG. 1 is a block diagram showing an example of an organic wastewater treatment method as claimed in the present invention.
Figure 2:
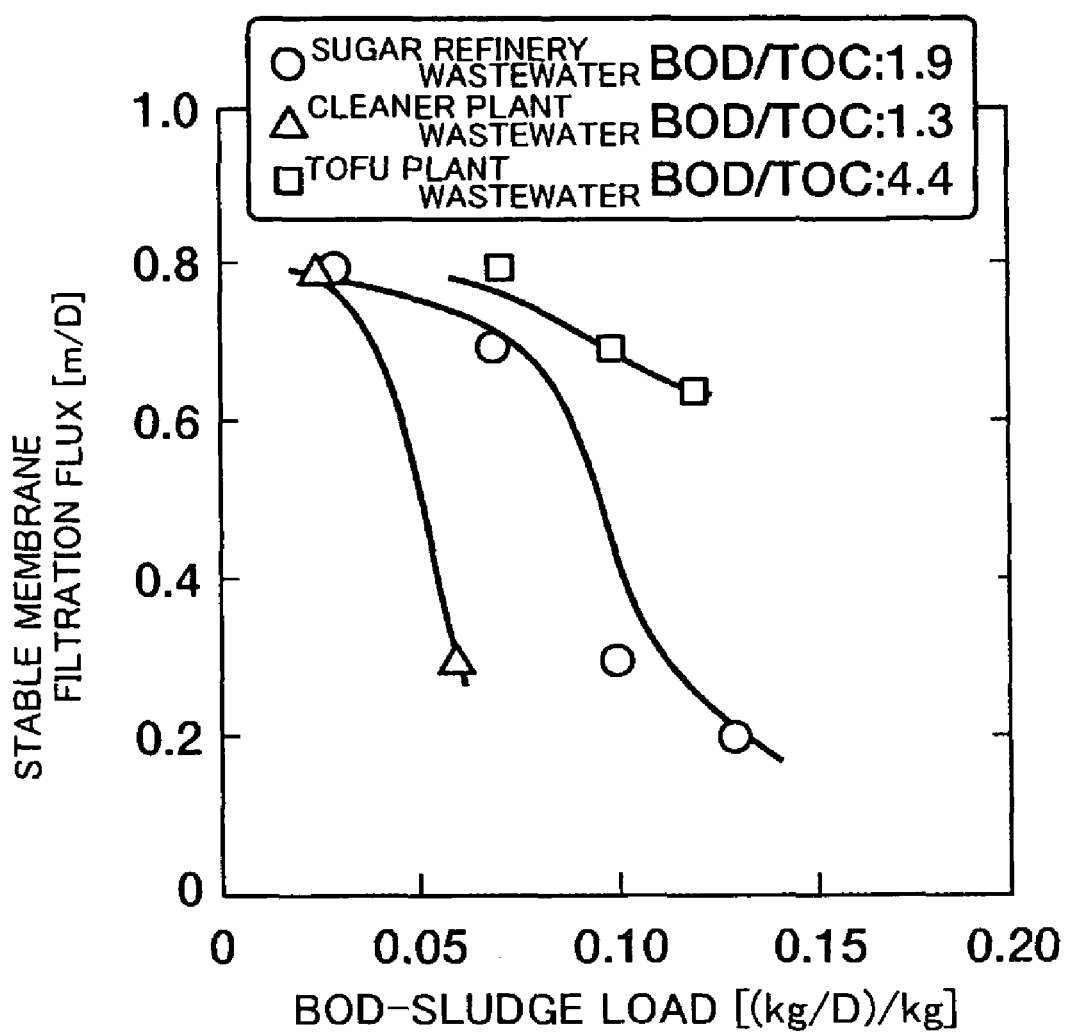
FIG. 2 is a graph representing the relationship between BOD-sludge load and stable membrane filtration flux at that time at different γ values.
Figure 3:
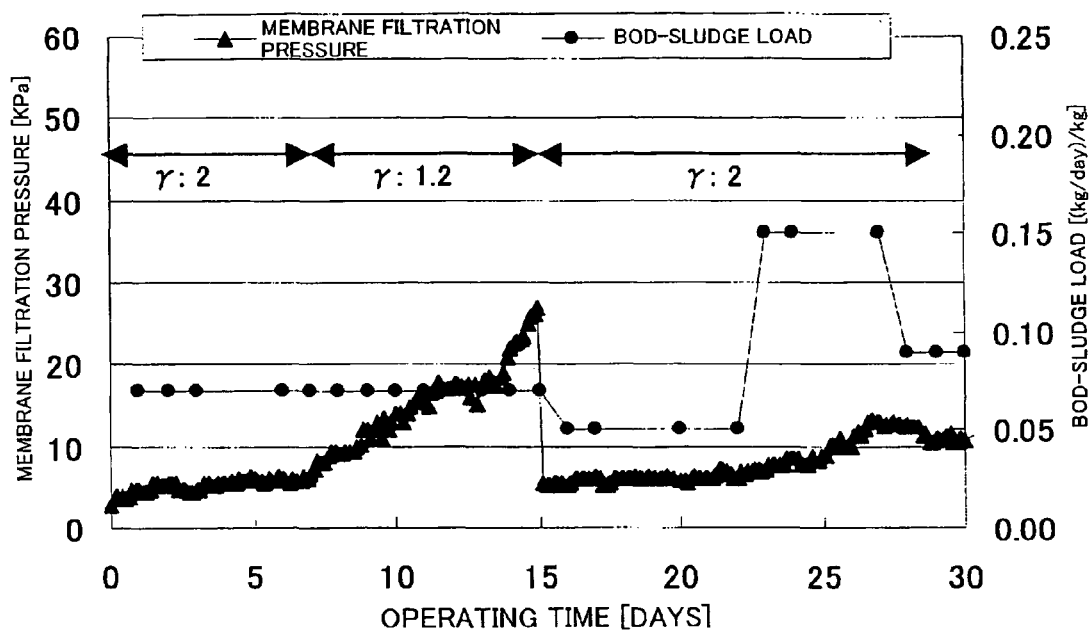
FIG. 3 is a graph showing time-based changes in inter-membrane differential pressure in Example 22.

1 . . . organic wastewater, 2 . . . pretreatment equipment, 3 . . . flow equalization tank, 4 . . . membrane separation activated sludge tank (aeration tank), 5 . . . pretreatment equipment, 6 . . . skirt, 7 . . . blower, 8 . . . suction pump, 9 . . . filtrate, 10 . . . sterilization tank, 11 . . . treated water

What is claimed is:

1. A wastewater treatment method comprising:
an inflow step of causing organic wastewater to flow into an activated sludge tank housing an activated sludge; and
a separation step of biologically treating the organic wastewater in the activated sludge tank with the activated sludge, and carrying out solid-liquid separation on the activated sludge with a separation membrane apparatus installed in or after the activated sludge tank, wherein
prior to the inflow step, an upper limit of BOD-sludge load is determined based on an index indicating the total organic content of the organic wastewater and a BOD value, and the BOD-sludge load in the activated sludge tank is adjusted so as not to exceed the upper limit.

2. A wastewater treatment method comprising:
an inflow step of causing organic wastewater to flow into an activated sludge tank housing an activated sludge; and
a separation step of biologically treating the organic wastewater in the activated sludge tank with the activated sludge, and carrying out solid-liquid separation on the activated sludge with a separation membrane apparatus installed in or after the activated sludge tank, wherein
prior to the inflow step, an upper limit of BOD-sludge load is determined based on a ratio between an index indicating the total organic content of the organic waste water and a BOD value, and average membrane filtration flux of the membrane separation apparatus, and the BOD-sludge load in the activated sludge tank is adjusted so as not to exceed the upper limit.

3. A wastewater treatment method comprising:
an inflow step of causing organic wastewater to flow into an activated sludge tank housing an activated sludge; and
a separation step of biologically treating the organic wastewater in the activated sludge tank with the activated sludge, and carrying out solid-liquid separation on the activated sludge with a separation membrane apparatus installed in or after the activated sludge tank, wherein
a BOD-sludge load in the activated sludge tank is adjusted to 0.05–0.06×(δ–0.6) ((kg/day)–BOD/kg–MLSS) or less when a γ value of the organic wastewater is such that 0.6≦γ<1.5;
wherein, γ=BOD/(α×β),
β is one of parameters selected from the total organic carbon (TOC–mg/L) in the organic wastewater, chemical oxygen demand using potassium dichromate (COD$_{Cr}$–mg/L) and total oxygen demand (TOD-mg/L),
BOD indicates the biological oxygen demand (mg/L) in the organic wastewater,
α is an adjustment coefficient based on β,
α=1.0 in the case of selecting TOC for β,
α=0.33 in the case of selecting COD$_{Cr}$ for β, or
α=0.33 in the case of selecting TOD for β, and
δ is defined as the average membrane filtration flux of the separation membrane apparatus in units of m$^3$/(m$^2$·day).

4. A wastewater treatment method comprising:
an inflow step of causing organic wastewater to flow into an activated sludge tank housing an activated sludge; and
a separation step of biologically treating the organic wastewater in the activated sludge tank with the activated sludge, and carrying out solid-liquid separation on the activated sludge with a separation membrane apparatus installed in or after the activated sludge tank, wherein
a BOD-sludge load in the activated sludge tank is adjusted to 0.1–0.12×(δ–0.6) ((kg/day)–BOD/kg–MLSS) or less when a γ value of the organic wastewater is such that 1.5≦γ<2.5 wherein, γ=BOD/(α×β), and δ is defined as the average membrane filtration flux of the separation membrane apparatus in units of m$^3$/(m$^2$·day).

5. A wastewater treatment method comprising:
an inflow step of causing organic wastewater to flow into an activated sludge tank housing an activated sludge; and
a separation step of biologically treating the organic wastewater in the activated sludge tank with the activated sludge, and carrying out solid-liquid separation on the activated sludge with a separation membrane apparatus installed in or after the activated sludge tank, wherein
a BOD-sludge load in the activated sludge tank is adjusted to 0.3–0.24×(δ–0.6) ((kg/day)–BOD/kg–MLSS) or less when a γ value of the organic wastewater is such that γ≧2.5 wherein, γ=BOD/(α×β), and δ is defined as the average membrane filtration flux of the separation membrane apparatus in units of $m^3/(m^2 \cdot day)$.

6. The wastewater treatment method according to any one of claims 3 to 5, comprising:
an inflow step of causing organic wastewater to flow into an activated sludge tank housing an activated sludge; and
a separation step of biologically treating the organic wastewater in the activated sludge tank with the activated sludge, and carrying out solid-liquid separation on the activated sludge with a separation membrane apparatus installed in or after the activated sludge tank, wherein
by mixing a substance having a high γ value into the organic wastewater when the γ value of the organic wastewater is γ<0.6, the γ value of the organic wastewater after mixing is such that $\Delta \geq 0.6$ wherein γ=BOD/(α×β).

7. The wastewater treatment method according to any one of claims 1 to 5, wherein the BOD-sludge load in the activated sludge tank is adjusted by increasing or decreasing one or more of parameters selected from the group consisting of activated sludge concentration, activated sludge volume, amount of organic matter flowing into the activated sludge tank, average membrane filtration flux and membrane surface area.

8. The wastewater treatment method according to any one of claims 3 to 5, wherein in the case the BOD-sludge load in the activated sludge tank exceeds the calculated upper limit of the BOD-sludge load, the upper limit of the BOD-sludge load is adjusted so as to exceed the BOD-sludge load in the activated sludge tank by decreasing the average membrane filtration flux.

9. The wastewater treatment method according to any one of claims 3 to 5, wherein in the case the BOD-sludge load in the activated sludge tank exceeds the calculated upper limit of the BOD-sludge load, the BOD-sludge load in the activated sludge tank is adjusted so as to be bellow the upper limit by increasing or decreasing one or more of parameters selected from the group consisting of activated sludge concentration, activated sludge volume, amount of organic matter flowing into the activated sludge tank and membrane surface area.

* * * * *